United States Patent
Bennett et al.

(10) Patent No.: US 7,000,034 B2
(45) Date of Patent: Feb. 14, 2006

(54) FUNCTION INTERFACE SYSTEM AND METHOD OF PROCESSING ISSUED FUNCTIONS BETWEEN CO-PROCESSORS

(75) Inventors: Victor A. Bennett, Rockwall, TX (US); David A. Brown, Austin, TX (US); Sean W. McGee, Austin, TX (US); David P. Sonnier, Austin, TX (US); Leslie Zsohar, Round Rock, TX (US)

(73) Assignee: Agere Systems Inc., Allentown, PA (US)

( * ) Notice: Subject to any disclaimer, the term of this patent is extended or adjusted under 35 U.S.C. 154(b) by 756 days.

(21) Appl. No.: 09/798,454

(22) Filed: Mar. 2, 2001

(65) Prior Publication Data

US 2002/0002626 A1    Jan. 3, 2002

Related U.S. Application Data

(60) Provisional application No. 60/186,424, filed on Mar. 2, 2000, provisional application No. 60/186,516, filed on Mar. 2, 2000.

(51) Int. Cl.
G06F 15/16   (2006.01)
G06F 15/20   (2006.01)
G06F 15/76   (2006.01)

(52) U.S. Cl. .................................. 709/250; 712/29
(58) Field of Classification Search .................. 710/5, 710/36, 39, 52, 107, 305, 306, 309, 240; 712/28, 29, 34, 35; 709/250
See application file for complete search history.

(56) References Cited

U.S. PATENT DOCUMENTS

| | | |
|---|---|---|
| 5,058,110 A | 10/1991 | Beach et al. |
| 5,630,054 A | 5/1997 | Trang |
| 5,663,952 A | 9/1997 | Gentry, Jr. |
| 5,699,460 A * | 12/1997 | Kopet et al. .................. 382/307 |
| 5,832,235 A | 11/1998 | Wilkes |
| 5,915,099 A * | 6/1999 | Takata et al. ................ 710/100 |
| 5,917,821 A | 6/1999 | Gobuyan et al. |
| 5,935,268 A | 8/1999 | Weaver |
| 5,987,022 A | 11/1999 | Geiger et al. |
| 6,032,197 A | 2/2000 | Birdwell et al. |
| 6,038,630 A * | 3/2000 | Foster et al. ................. 710/317 |
| 6,038,694 A | 3/2000 | Swallow |
| 6,122,670 A | 9/2000 | Bennett et al. |
| 6,182,267 B1 | 1/2001 | Kidd et al. |
| 6,198,735 B1 | 3/2001 | Pazhyannur et al. |
| 6,208,651 B1 | 3/2001 | Van Renesse et al. |
| 6,253,271 B1 | 6/2001 | Ram et al. |
| 6,314,095 B1 | 11/2001 | Loa |
| 6,356,972 B1 * | 3/2002 | Chin et al. ................... 710/310 |
| 6,427,169 B1 | 7/2002 | Elzur et al. |
| 6,449,656 B1 | 9/2002 | Elzur et al. |
| 6,480,291 B1 | 11/2002 | Daniels et al. |
| 6,529,503 B1 * | 3/2003 | Chiang et al. ............... 370/363 |
| 6,530,061 B1 | 3/2003 | Labatte |

(Continued)

*Primary Examiner*—Jeffrey Gaffin
*Assistant Examiner*—David Martinez

(57) ABSTRACT

A function interface system for use with a fast pattern processor having an internal function bus and an external function bus and a method of operating the same. In one embodiment, the function interface system includes a controller arbitration subsystem configured to process an issued function request received from at least one of the internal function bus and the external function bus and a dispatch subsystem configured to retrieve the issued function request and dispatch the issued function request to at least one associated co-processor via the controller arbitration subsystem.

35 Claims, 6 Drawing Sheets

U.S. PATENT DOCUMENTS 6,553,446 B1 * 4/2003 Miller .................... 710/307
6,684,321 B1 * 1/2004 Falardeau ................ 712/29
2001/0032305 A1 * 10/2001 Barry ..................... 712/34
2003/0120865 A1 * 6/2003 McDonald et al. ......... 711/114

* cited by examiner

FUNCTION INTERFACE SYSTEM AND METHOD OF PROCESSING ISSUED FUNCTIONS BETWEEN CO-PROCESSORS

CROSS-REFERENCE TO PROVISIONAL APPLICATION

This application claims the benefit of U.S. Provisional Application No. 60/186,424 entitled "FPP" to David Sonnier, et al., filed on Mar. 2, 2000, and of U.S. Provisional Application No. 60/186,516 entitled "RSP" to David Sonnier, et al., filed on Mar. 2, 2000, which is commonly assigned with the present invention and incorporated herein by reference as if reproduced herein in its entirety.

CROSS-REFERENCE TO RELATED APPLICATIONS

| Reference No. | Title | Inventor | Date |
|---|---|---|---|
| SN 09/798,472 (BENNETT 5-6-2-3-10-3) | A Virtual Reassembly System And Method of Operation Thereof | Bennett, et al. | Filed Mar. 2, 2001 |
| SN 09/798,479 (BROWN 2) | A Checksum Engine And Method of Operation Thereof | David A. Brown | Filed Mar. 2, 2001 |

The above-listed applications are commonly assigned co-pending with the present invention and are incorporated herein by reference as if reproduced herein in their entirety.

TECHNICAL FIELD OF THE INVENTION

The present invention is directed, in general, to a communications system and, more specifically, to a function interface system and method of operating the same.

BACKGROUND OF THE INVENTION

Communications networks are currently undergoing a revolution brought about by the increasing demand for real-time information being delivered to a diversity of locations. Many situations require the ability to transfer large amounts of data across geographical boundaries with increasing speed and accuracy. However, with the increasing size and complexity of the data that is currently being transferred, maintaining the speed and accuracy is becoming increasingly difficult.

Early communications networks resembled a hierarchical star topology. All access from remote sites was channeled back to a central location where a mainframe computer resided. Thus, each transfer of data from one remote site to another, or from one remote site to the central location, had to be processed by the central location. This architecture is very processor-intensive and incurs higher bandwidth utilization for each transfer. This was not a major problem in the mid to late 1980s where fewer remote sites were coupled to the central location. Additionally, many of the remote sites were located in close proximity to the central location. Currently, hundreds of thousands of remote sites are positioned in various locations across assorted continents. Legacy networks of the past are currently unable to provide the data transfer speed and accuracy demanded in the marketplace of today.

In response to this exploding demand, data transfer through networks employing distributed processing has allowed larger packets of information to be accurately and quickly distributed across multiple geographic boundaries. Today, many communication sites have the intelligence and capability to communicate with many other sites, regardless of their location. This is typically accomplished on a peer level, rather than through a centralized topology, although a host computer at the central site can be appraised of what transactions take place and can maintain a database from which management reports are generated and operation issues addressed.

Distributed processing currently allows the centralized site to be relieved of many of the processor-intensive data transfer requirements of the past. This is typically accomplished using a data network, which includes a collection of routers. The routers allow intelligent passing of information and data files between remote sites. However, increased demand and the sophistication required to route current information and data files quickly challenged the capabilities of existing routers. Also, the size of the data being transmitted is dramatically increasing. Some efficiencies are obtained by splitting longer data files into a collection of smaller, somewhat standardized cells for transmission or routing. However, these efficiencies are somewhat offset by the processing required to reassemble or process the cells at nodes within the network.

More specifically, within the system at the nodes there are limitations associated with the bus architectures between multiple processing engines. Due to higher bandwidth requirements, it is necessary to prevent operations utilizing the bus architecture from stalling or bottlenecking. Therefore, what is needed in the art is a way to enhance bus architecture performance associated with a system employed in a communications network that overcomes the deficiencies of the prior art.

SUMMARY OF THE INVENTION

To address the above-discussed deficiencies of the prior art, the present invention provides a function interface system for use with a fast pattern processor having an internal function bus and an external function bus and a method of operating the same. In one embodiment, the function interface system includes: (1) a controller arbitration subsystem configured to process an issued function request received from at least one of the internal function bus and the external function bus and (2) a dispatch subsystem configured to retrieve the issued function request and dispatch the issued function request to at least one associated co-processor via the controller arbitration subsystem.

In another embodiment, the present invention provides a method of processing issued function requests that includes: (1) processing an issued function request received from at least one of the internal function bus and the external function bus and (2) dispatching the issued function request to at least one associated co-processor via the controller arbitration subsystem.

The present invention also provides, in another embodiment, a fast pattern processor that includes: (1) an internal function bus, (2) an external function bus, (3) a context memory having a block buffer and a argument signature register wherein the block buffer includes processing blocks associated with a protocol data unit (PDU), and (4) a pattern processing engine, associated with the context memory, that performs pattern matching. The fast pattern processor also includes a function interface system having: (1) a controller arbitration subsystem that processes an issued function request received from at least one of the internal function bus and the external function bus and (2) a dispatch subsystem that retrieves the issued function request and dispatches the issued function request to at least one associated co-processor via the controller arbitration subsystem.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
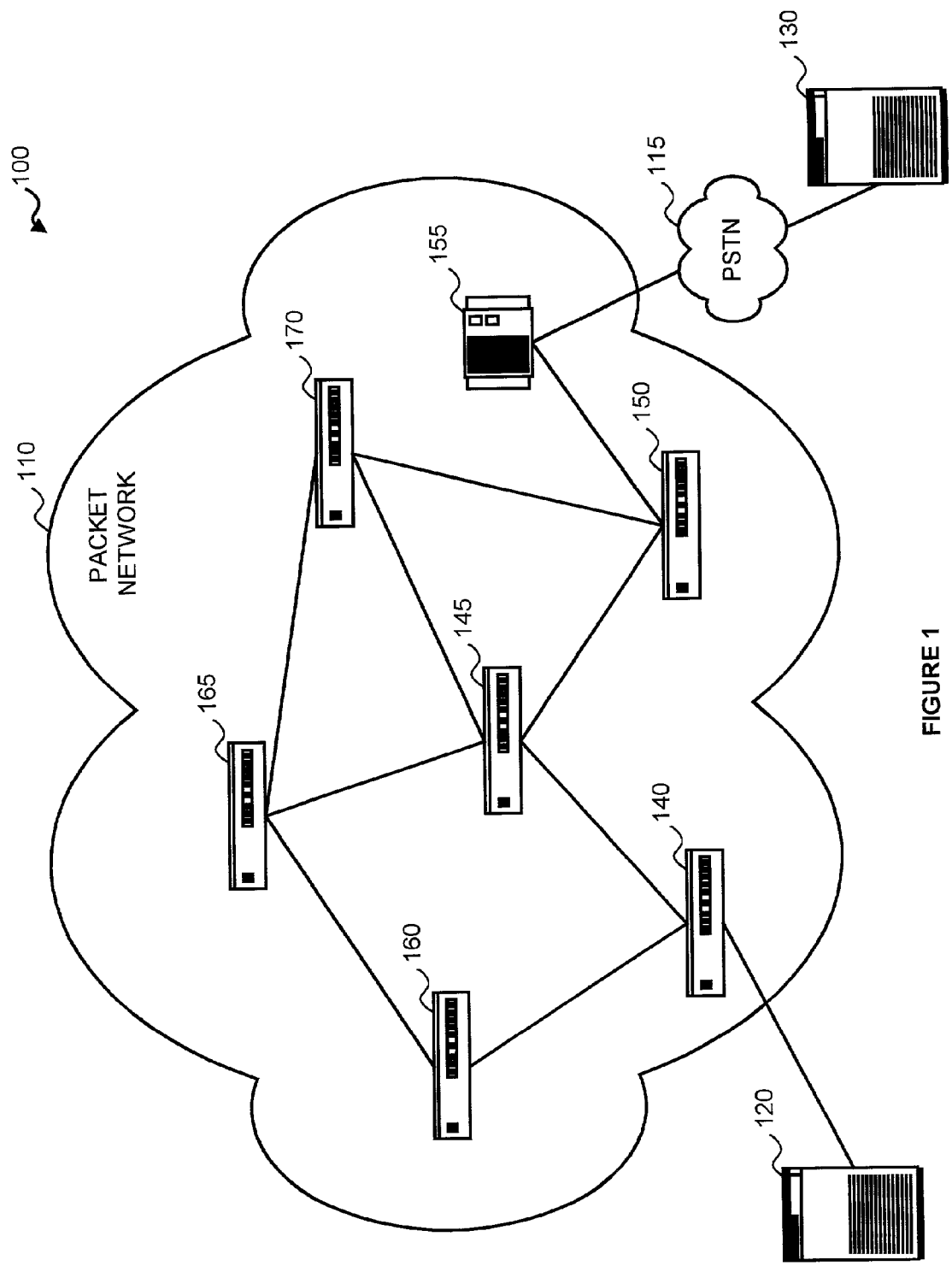
FIG. 1 illustrates a block diagram of an embodiment of a communications network constructed in accordance with the principles of the present invention.

Referring initially to FIG. 1, illustrated is a block diagram of an embodiment of a communications network, generally designated 100, constructed in accordance with the principles of the present invention. The communications network 100 is generally designed to transmit information in the form of a data packet from one point in the network to another point in the network.

As illustrated, the communications network 100 includes a packet network 110, a public switched telephone network (PSTN) 115, a source device 120 and a destination device 130. In the illustrative embodiment shown in FIG. 1, the packet network 110 comprises an Asynchronous Transfer Mode (ATM) network. However, one skilled in the art readily understands that the present invention may use any type of packet network. The packet network 110 includes routers 140, 145, 150, 160, 165, 170 and a gateway 155. One skilled in the pertinent art understands that the packet network 110 may include any number of routers and gateways.

The source device 120 may generate a data packet to be sent to the destination device 130 through the packet network 110. In the illustrated example, the source device 120 initially sends the data packet to the first router 140. The first router 140 then determines from the data packet which router to send the data packet to based upon routing information and network loading. Some information in determining the selection of a next router may include the size of the data packet, loading of the communications link to a router and the destination. In this example, the first router 140 may send the data packet to the second router 145 or fourth router 160.

The data packet traverses from router to router within the packet network 110 until it reaches the gateway 155. In one particular example, the data packet may travers along a path that includes the first router 140, the fourth router 160, the fifth router 165, the sixth router 170, the third router 150 and finally to the gateway 155. The gateway 155 converts the data packet from the protocol associated with the packet network 110 to a different protocol compatible with the PSTN 115. The gateway 155 then transmits the data packet to the destination device 130 via the PSTN 115. However, in another example, the data packet may traverse along a different path such as the first router 140, the second router 145, the third router 150 and finally to the gateway 155. It is generally desired when choosing a subsequent router, the path the data packet traverses should result in the fastest throughput for the data packet. It should be noted, however, that this path does not always include the least number of routers.

Figure 2:
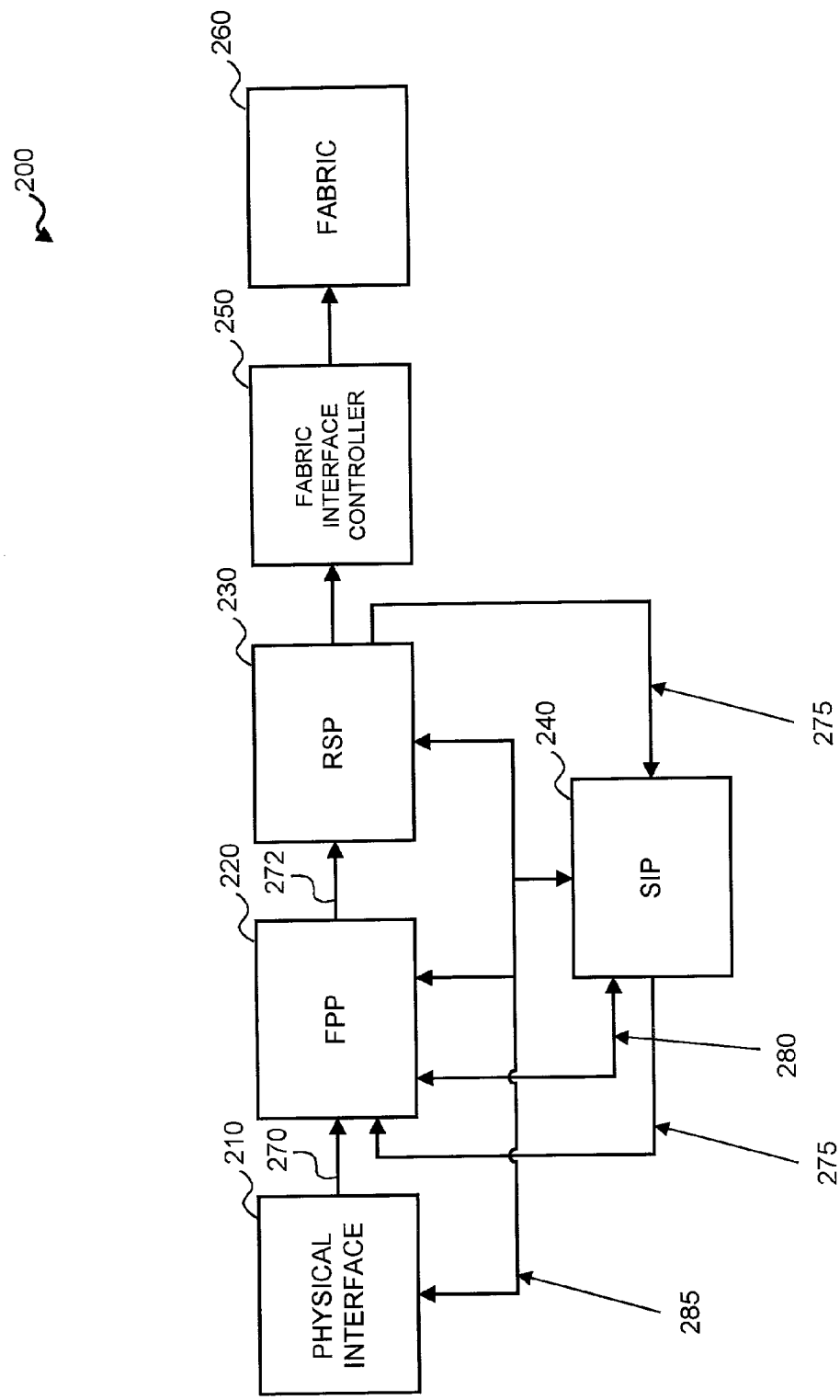
FIG. 2 illustrates a block diagram of an embodiment of a router architecture constructed in accordance with the principles of the present invention.

Turning now to FIG. 2, illustrated is a block diagram of an embodiment of a router architecture, generally designated 200, constructed in accordance with the principles of the present invention. The router architecture 200, in one embodiment, may be employed in any of the routers illustrated in FIG. 1. The router architecture 200 provides a unique hardware and software combination that delivers high-speed processing for multiple communication protocols with full programmability. The unique combination provides the programmability of traditional reduced instruction set computing (RISC) processors with the speed that, until now, only application-specific integrated circuit (ASIC) processors could deliver.

In the embodiment shown in FIG. 2, the router architecture 200 includes a physical interface 210, a fast pattern processor (FPP) 220, a routing switch processor (RSP) 230, and a system interface processor (SIP) 240. The router architecture 200 may also includes a fabric interface controller 250 which is coupled to the RSP 230 and a fabric network 260. It should be noted that other components not shown may be included within the router architecture 200 without departing from the scope of the present invention.

The physical interface 210 provides coupling to an external network. In an exemplary embodiment, the physical interface 210 is a POS-PHY/UTOPIA level 3 interface. The FPP 220, in one embodiment, may be coupled to the physical interface 210 and receives a data stream that includes protocol data units (PDUs) from the physical interface 210. The FPP 220 analyzes and classifies the PDUs and subsequently concludes processing by outputting packets to the RSP 230.

The FPP 220, in conjunction with a powerful high-level functional programming language (FPL), is capable of implementing complex pattern or signature recognition and operates on the processing blocks containing those signatures. The FPP 220 has the ability to perform pattern analysis on every byte of the payload plus headers of a data stream. The pattern analysis conclusions may then be made available to a system logic or to the RSP 230, allowing processing block manipulation and queuing functions. The FPP 220 and RSP 230 provide a solution for switching and routing. The FPP 220 further provides glueless interfaces to the RSP 230 and the SIP 240 to provide a complete solution for wire-speed processing in next-generation, terabit switches and routers.

As illustrated in FIG. 2, the FPP 220 employs a first communication link 270 to receive the data stream from the physical interface 210. The first communication link 270 may be an industry-standard UTOPIA Level 3/UTOPIA Level 2/POS-PHY Level 3 interface. Additionally, the FPP 220 employs a second communication link 272 to transmit packet and conclusions to the RSP 230. The second communication link 272 may be POS-PHY Level 3 interface.

The FPP 220 also includes a management path interface (MPI) 275, a function bus interface (FBI) 280 and a configuration bus interface (CBI) 285. The MPI 275 enables the FPP 220 to receive management frames from a local microprocessor. In an exemplary embodiment, this may be handled through the SIP 240. The FBI 280 connects the FPP 220 and the SIP 240, or custom logic in certain situations, for external processing of function calls. The CBI 285 connects the FPP 220 and other devices (e.g., physical interface 210 and RSP 230) to the SIP 240. Other interfaces (not shown), such as memory interfaces, are also well within the scope of the present invention.

The FPP 220 provides an additional benefit in that it is programmable to provide flexibility in optimizing performance for a wide variety of applications and protocols. Because the FPP is a programmable processor rather than a fixed-function ASIC, it can handle new protocols or applications as they are developed as well as new network functions as required. The FPP 220 may also accommodate a variety of search algorithms. These search algorithms may be applied to large lists beneficially.

The RSP 230 is also programmable and works in concert with the FPP 220 to process the PDUs classified by the FPP 220. The RSP 230 uses the classification information received from the FPP 220 to determine the starting offset and the length of the PDU payload, which provides the classification conclusion for the PDU. The classification information may be used to determine the port and the associated RSP 230 selected for the PDU. The RSP 230 may also receive additional PDU information passed in the form of flags for further processing.

The RSP 230 also provides programmable traffic management including policies such as random early discard (RED), weighted random early discard (WRED), early packet discard (EPD) and partial packet discard (PPD). The RSP 230 may also provide programmable traffic shaping, including programmable per queue quality of service (QoS) and class of service (CoS) parameters. The QoS parameters include constant bit rate (CBR), unspecified bit rate (UBR), and variable bitrate (VBR). Correspondingly, CoS parameters include fixed priority, round robin, weighted round robin (WRR), weighted fair queuing (WFQ) and guaranteed frame rate (GFR).

Alternatively, the RSP 230 may provide programmable packet modifications, including adding or stripping headers and trailers, rewriting or modifying contents, adding tags and updating checksums and CRCs. The RSP 230 may be programmed using a scripting language with semantics similar to the C language. Such script languages are well known in the art. Also connected to the RSP 230 are the fabric interface controller 250 and the fabric network 260. The fabric interface controller 250 provide the physical interface to the fabric 260, which is typically a communications network.

The SIP 240 allows centralized initialization and configuration of the FPP 220, the RSP 230 and the physical interfaces 210, 250. The SIP 240, in one embodiment, may provide policing, manage state information and provide a peripheral component interconnect (PCI) connection to a host computer. The SIP 240 may be a PayloadPlus™ Agere System Interface commercially available from Agere Systems, Inc.

Figure 3:
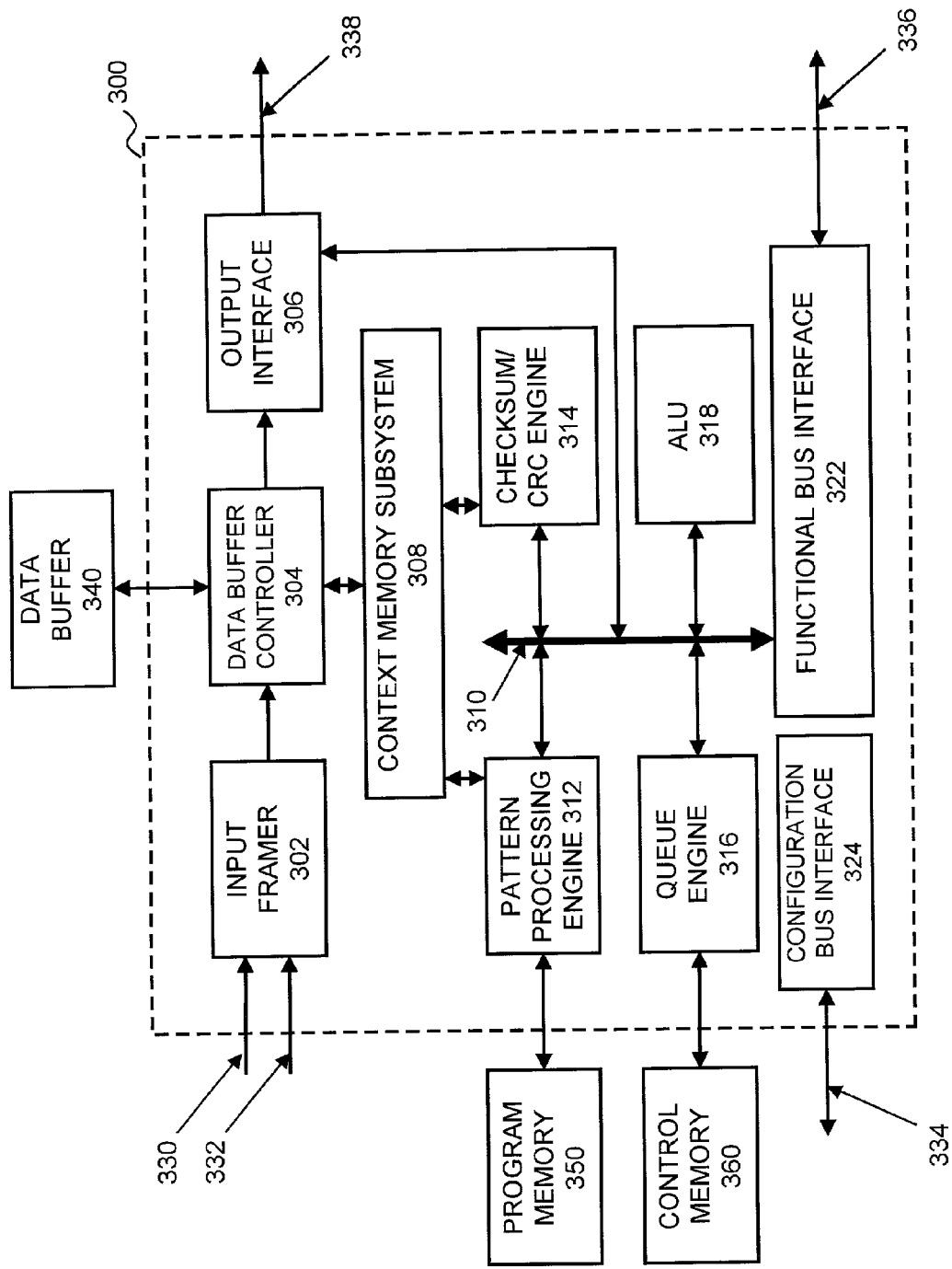
FIG. 3 illustrates a block diagram of an embodiment of a fast pattern processor constructed in accordance with the principles of the present invention.

Turning now to FIG. 3, illustrated is a block diagram of an embodiment of a fast pattern processor (FPP), generally designated 300, constructed in accordance with the principles of the present invention. The FPP 300 includes an input framer 302 that receives PDUs via external input data streams 330, 332. The input framer 302 frames packets containing the PDUs into 64-byte processing blocks and stores the processing blocks into an external data buffer 340. The input data streams 330, 332 may be 32-bit UTOPIA/POS-PHY from PHY and 8-bit POS-PHY management path interface from SIP 240 (FIG. 2), respectively.

Typically, a data buffer controller 304 is employed to store the processing blocks to the external data buffer 340. The data buffer controller 304 also stores the processing blocks and associated configuration information into a portion of a context memory subsystem 308 associated with a context, which is a processing thread. As illustrated, the context memory subsystem 308 is coupled to a data buffer controller 304.

Additionally, the context memory subsystem 308 is coupled to a checksum/cyclical redundancy check (CRC) engine 314 and a pattern processing engine 312. The checksum/CRC engine 314 performs checksum or CRC functions on processing block and on the PDUs embodied with the processing block. The pattern processing engine 312 performs pattern matching to determine how PDUs are classified and processed. The pattern processing engine 312 is coupled to a program memory 350.

The FPP 300 further includes a queue engine 316 and an arithmetic logic unit (ALU) 318. The queue engine 316 manages replay contexts for the FPP 300, provides addresses for block buffers and maintains information on blocks, PDUs, and connection queues. The queue engine 316 is coupled to an external control memory 360 and the internal function bus 310. The ALU 318 is coupled to the internal function bus 310 and is capable of performing associated computational functions.

Also coupled to the internal function bus 310 is a functional bus interface 322. The functional bus interface 322 passes external functional programming language function calls to external logic through a data port 336. In one exemplary embodiment, the data port 336 is a 32-bit connection to the SIP 240 (FIG. 2). The FPP 300 also includes a configuration bus interface 324 for processing configuration requests from externally coupled processors. As illustrated, the configuration bus interface 324 may be coupled to a data port 334, such as an 8-bit CBI source.

Additionally, coupled to the internal function bus 310 is an output interface 306. The output interface 306 sends PDUs and their classification conclusions to the downstream logic. The output interface 306 may retrieve the processing blocks stored in the data buffer 340 and send the PDUs embodied within the processing blocks to an external unit through an output data port 338. The output data port 338, in an exemplary embodiment, is a 32-bit POS-PHY connected to the RSP 230 (FIG. 2).

Figure 4:
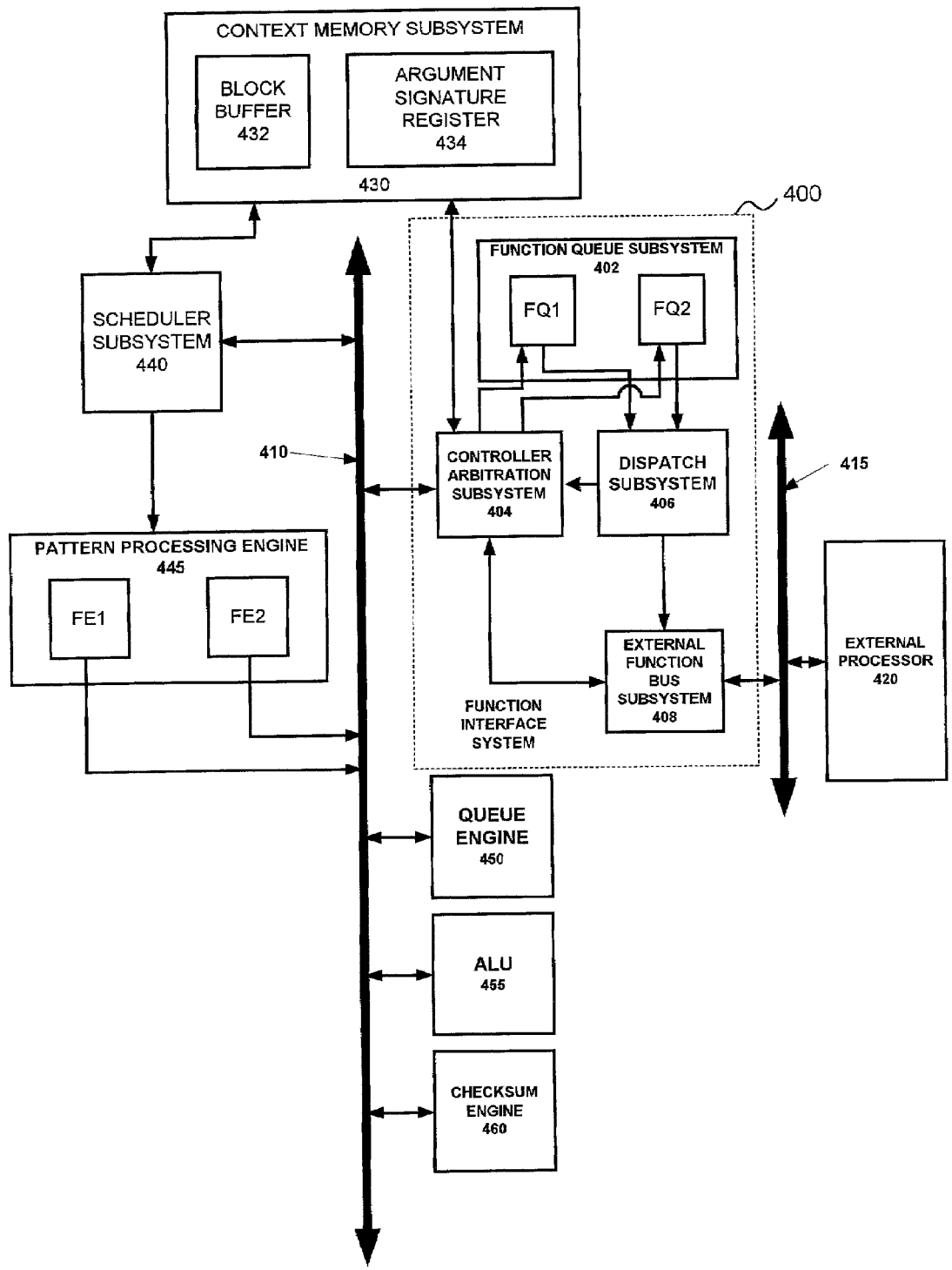
FIG. 4 illustrates a block diagram of an embodiment of a function interface system for use with a fast pattern processor constructed according to the principles of the present invention.

Turning now to FIG. 4, illustrated is a block diagram of an embodiment of a function interface system, generally designated 400, for use with a fast pattern processor constructed according to the principles of the present invention. The function interface system 400 includes a function queue subsystem 402 having first and second function queues FQ1, FQ2, a controller arbitration subsystem 404, a dispatch subsystem 406 and an external function bus subsystem 408. In the illustrated embodiment, the function interface system 400 is coupled to an internal function bus 410, an external function bus 415 and an external processor 420, which is an associated co-processor that performs as a system interface processor.

The current embodiment of the function interface system 400 is also coupled to a context memory subsystem 430 having a block buffer 432 and an argument signature register 434, a scheduler subsystem 440, a pattern processing engine 445 having first and second flow engines FE1, FE2 and a group of associated co-processors. The co-processor may include a queue engine 450, an arithmetic logic unit (ALU) 455 and a checksum engine 460.

The controller arbitration subsystem 404 is configured to process an issued function request received from either the internal function bus 410 or the external function bus 415. Correspondingly, the controller arbitration subsystem 404 arbitrates access to the block buffer 432, which contains processing blocks associated with PDUs wherein each processing block is assigned to a context in the block buffer 432. Each PDU may be segregated into processing blocks having a fixed length of 64 bytes, in this embodiment. Of course, however, the present invention is not limited to processing blocks of 64 bytes. Other embodiments of the present invention may employ processing blocks of any size.

Additionally, the controller arbitration subsystem 404 arbitrates access to the argument signature register 434, which has a plurality of memory locations that contain an argument associated with a processing block and its context. The argument is passed between the pattern processing engine 445 and at least one of the associated co-processors. The scheduler subsystem 440 is configured to manage the contexts associated with the processing blocks and schedule processing in the pattern processing engine 445 based upon the associated context.

The function queue subsystem 402, which is associated with the controller arbitration subsystem 404 as shown, is configured to manage a plurality of function request queues. This is accomplished by employing the first and second function queues FQ1, FQ2 to queue an issued function request. The dispatch subsystem 406, which is also associated with the function queue subsystem 402, is configured to retrieve the issued function request from the first and second function queues FQ1, FQ2 of the function queue subsystem 402. The issued function request is dispatched to at least one of the associated co-processors via the controller arbitration subsystem 404.

The dispatch subsystem 406, in one embodiment, is further configured to dispatch the issued function request to the external function bus subsystem 408, which processes the issued function request associated with a co-processor via the external function bus 415. The external function bus subsystem 408 may also receive issued function requests from the external function bus 415 for submission to the controller arbitration subsystem 404 for processing.

In the illustrated embodiment, the pattern processing engine 445 employs the first and second flow engines FE1, FE2 to process the processing blocks based on their associated contexts. Each of the first and second flow engines FE1, FE2 operate in a parallel, pipeline manner and are configured to process at least one of the processing blocks based on its context. In the illustrated embodiment, the first flow engine FE1 processes even number contexts and the second flow engine FE2 processes odd number contexts. Typically, the first and second flow engines FE1, FE2 may have several processing blocks associated with several contexts that are being processed at any one time.

This parallel, pipeline arrangement employing multiple processing blocks and contexts minimizes the number of wasted cycles on the internal and external function buses 410, 415. This advantageously allows the pattern processing engine 445 to maximize throughput and therefore contribute to enhancing the overall performance bandwidth of the fast pattern processor. Of course, the principles of the present invention allow for more than two parallel, pipeline flow engines that may accommodate processing blocks with more that two classes of contexts to be employed.

Figure 5:
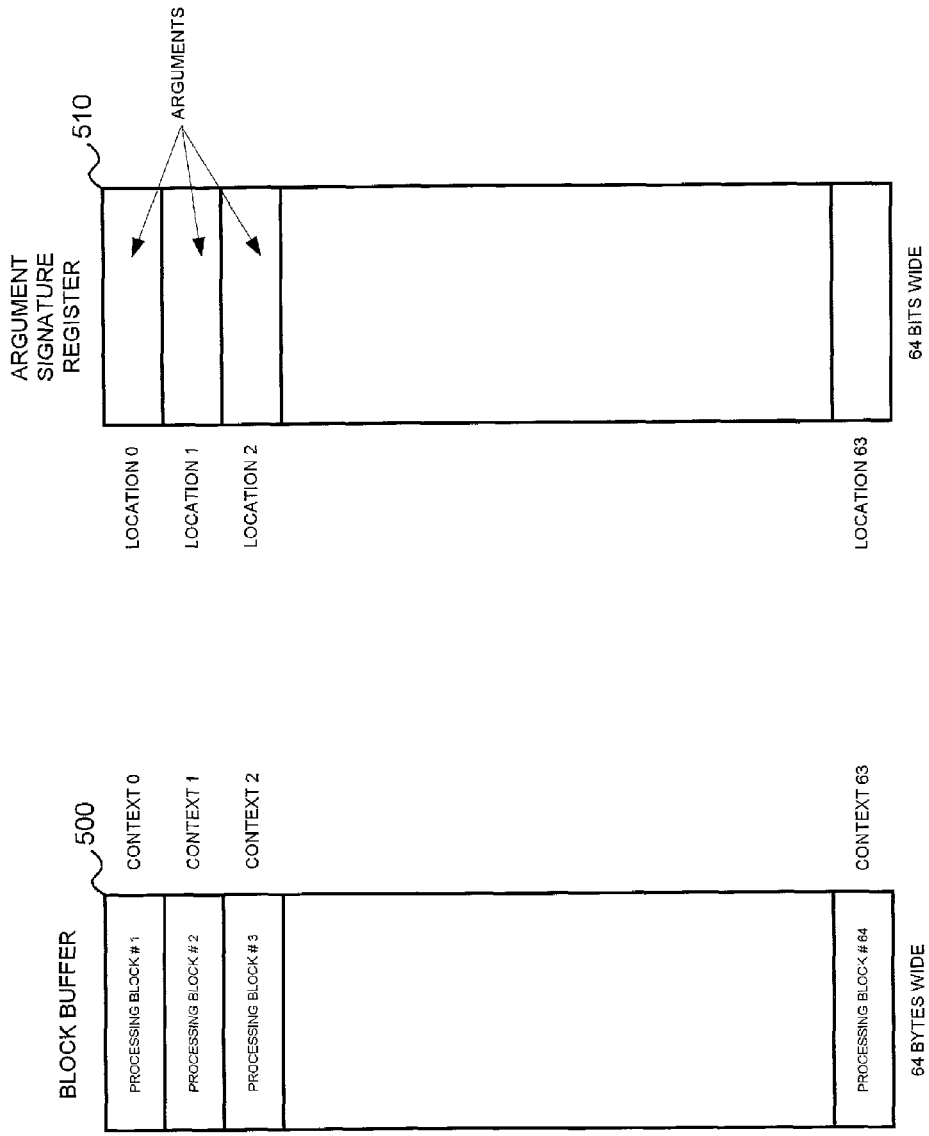
FIGS. 5A and 5B illustrate respective diagrams of embodiments of a block buffer and an argument signature register constructed in accordance with the principles of the present invention.

Turning now to FIGS. 5A and 5B, illustrated are respective diagrams of embodiments of a block buffer 500 and an argument signature register 510 constructed in accordance with the principles of the present invention. Each context location may contain one processing block. The block buffer 500 includes 64 different context locations ranging from context 0 through context 63, as shown. The block buffer 500 will therefore accommodate 64 processing blocks indicated as processing block #1 through processing block #64 wherein each processing block has a width of 64 bytes. Of course, however, the block buffer 500 is not limited to 64 context locations and a width of 64 bytes. Other embodiments of the present invention may have any number of context locations and wherein each location may be of any width.

The block buffer 500 is used to temporarily store a processing block associated with a PDU. Typically, processing blocks associated with a particular PDU are not stored contiguously in the block buffer 500. The storage location of a processing block is random and depends on context location availability at the time the processing block is stored. In one embodiment, access to the block buffer 500 is arbitrated by a controller arbitration subsystem such as the one discussed above in FIG. 4.

The argument signature register 510 includes 64 different argument locations ranging from an argument location 0 to an argument location 63. Each argument location contains an argument that may be a queue number, a set of flags, offsets or a string number. Of course, an argument may contain any other type of information or parameter employable by the present invention. Each of the argument locations 0–63 will accommodate an argument of 64 bits in width. Of course, however, the argument signature register 510 is not limited to 64 argument locations and a width of 64 bits. Other embodiments of the present invention may have any number of argument locations and wherein each location may be of any width.

In the illustrated embodiment, each argument location corresponds to a context and is accessed using a context number. Thus, the present invention advantageously allows arguments to be passed between different co-processors using a context number. In one embodiment, access to an argument may be arbitrated by a controller arbitration subsystem as discussed in FIG. 4 above.

Figure 6:
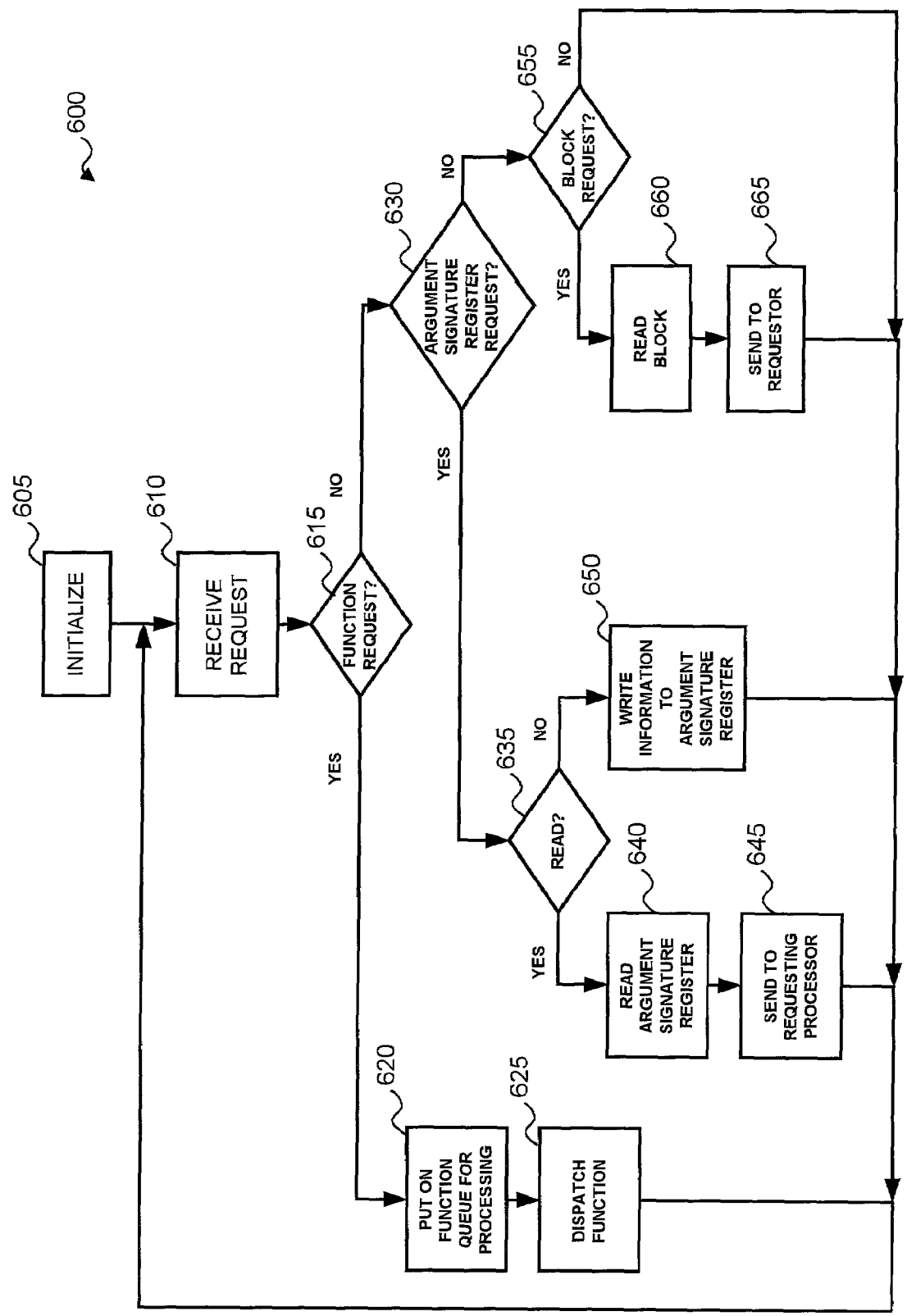
FIG. 6 illustrates a flow diagram of an embodiment of a method of processing issued function requests in a fast pattern processor having an internal function bus and an external function bus constructed in accordance with the principles of the present invention.

Turning now to FIG. 6, illustrated is a flow diagram of an embodiment of a method, generally designated 600, of processing issued function requests in a fast pattern processor having an internal function bus and an external function bus constructed in accordance with the principles of the present invention. The method 600 starts with initialization in a step 605 and then receiving a request in a step 610. The determination is made as to whether the request is a function request in a first decisional step 615. If a function request has been received from the internal function bus or the external function bus, the function is put on a function queue for processing in a step 620. The function queue then presents the issued function request for dispatch to at least one associated co-processor in a step 625. In one embodiment, this is accomplished by the controller arbitration subsystem at an appropriate time wherein the function is dispatched in the step 625. In another embodiment, once the request has been determined to be a function request, the method 600 may concurrently process the function request while receiving and determining another request. Next, the method 600 returns to the step 610 to receive the next request.

If a function request is not received in the first decisional step 615, then a second decisional step 630 determines if the received request is an argument signature register request. The argument signature register has a plurality of memory locations that contain an argument, associated with a context, to be passed between a pattern processing engine and at least one associated co-processor. In another embodiment, the method 600 may process this argument signature register request concurrently with a function request.

The nature of the argument signature register request is further determined in a third decisional step 635 as to whether the argument signature register request is to be read. If the argument signature register is to be read, the appropriate argument signature register is read in a step 640. Next, the contents of the argument signature register is sent to the processor that sent the request in a step 645. The method 600 again returns to the step 610 to receive the next request. If the argument signature register is not to be read, the argument sent with the request is written to the appropriate argument signature register in a step 650. Reading and writing to the argument signature register is based upon a context number. The method again returns to the step 610 to receive the next request.

If an argument signature register request is not received in the second decisional step 630, a fourth decisional step 655 determines if the received request is a block request. If the request is to read a block, then the block is read in a step 660. The block is sent to the processor or co-processor that requested the block in a step 665. In one embodiment, the block is sent to a processor or a co-processor coupled to the internal function bus. In a related embodiment, the block is sent to a processor or a co-processor coupled to the external function bus via an external function bus subsystem. At the conclusion of the step 665 or if the fourth decisional step 655 determines that the request is not a block request, the method 600 then returns to the step 610 to receive the next request.

One skilled in the pertinent art should know that the present invention is not limited to the types of requests described above. Nor is the present invention limited to sequence of processing. Other embodiments of the present invention may include additional request types and may have additional or fewer steps than described above.

Although the present invention has been described in detail, those skilled in the art should understand that they can make various changes, substitutions and alterations herein without departing from the spirit and scope of the invention in its broadest form.

What is claimed is:

1. For use with a fast pattern processor having an internal function bus and an external function bus, a function interface system, comprising:
   a controller arbitration subsystem configured to arbitrate access to a block buffer containing processing blocks associated with a protocol data unit (PDU) and process an issued function request received from at least one of said internal function bus and said external function bus; and
   a dispatch subsystem configured to retrieve said issued function request from a queue associated with said controller arbitration subsystem and dispatch said issued function request to at least one associated co-processor via said controller arbitration subsystem.

2. The function interface system as recited in claim 1 wherein said queue is a function queue subsystem configured to manage a plurality of function request queues and queue said issued function request.

3. The function interface system as recited in claim 1 further comprises an external function bus subsystem configured to process said issued function request associated with a co-processor via said external function bus.

4. The function interface system as recited in claim 3 wherein said dispatch subsystem is further configured to dispatch said issued function request to said external function bus subsystem.

5. The function interface system as recited in claim 1 further comprises an argument signature register having a plurality of memory locations that contain an argument, associated with a context, to be passed between a pattern processing engine and said at least one associated co-processor, said controller arbitration subsystem further configured to arbitrate access to said argument signature register.

6. The function interface system as recited in claim 1 wherein said at least one associated co-processor is selected from the group consisting of:
   a queue engine,
   an arithmetic logic unit,
   a checksum engine, and
   a system interface processor.

7. The function interface system as recited in claim 1 further comprises a scheduler subsystem configured to manage a context associated with said processing blocks and schedule processing in a pattern processing engine based upon a context.

8. The function interface system as recited in claim 7 wherein said pattern processing engine comprises a first and second flow engine configured to process one of said processing blocks based upon said context.

9. The function interface system as recited in claim 8 wherein said first flow engine processes even number contexts and said second flow engine processes odd number contexts.

10. For use with a fast pattern processor having an internal function bus and an external function bus, a method of processing issued function requests, comprising:
    processing an issued function request received from at least one of said internal function bus and said external function bus, said processing including arbitrating access to a block buffer containing processing blocks associated with a protocol data unit (PDU); and dispatching said issued function request to at least one associated co-processor via a controller arbitration subsystem.

11. The method as recited in claim 10 further comprising managing a plurality of function request queues and queuing said issued function request, said dispatching further includes retrieving said issued function request from said function request queues.

12. The method as recited in claim 10 further comprising processing said issued function request associated with a co-processor via said external function bus.

13. The method as recited in claim 12 wherein said dispatching further includes dispatching said issued function request to said external function bus.

14. The method as recited in claim 10 further comprising an argument signature register having a plurality of memory locations that contain an argument, associated with a context, to be passed between a pattern processing engine and said at least one associated co-processor, said processing further includes arbitrating access to said argument signature register.

15. The method as recited in claim 10 wherein said at least one associated co-processor is selected from the group consisting of:
a queue engine,
an arithmetic logic unit,
a checksum engine, and
a system interface processor.

16. The method as recited in claim 10 further comprises managing a context associated with said processing blocks and scheduling processing in a pattern processing engine based upon a context.

17. The method as recited in claim 16 wherein said pattern processing engine comprises a first and second flow engine configured to process one of said processing blocks based upon said context.

18. The method as recited in claim 17 wherein said first flow engine processes even number contexts and said second flow engine processes odd number contexts.

19. For use with a fast pattern processor having an internal function bus and an external function bus, a function interface system, comprising:
a controller arbitration subsystem configured to process an issued function request received from at least one of said internal function bus and said external function bus;
a dispatch subsystem configured to retrieve said issued function request from a queue associated with said controller arbitration subsystem and dispatch said issued function request to at least one associated co-processor via said controller arbitration subsystem; and
an argument signature register having a plurality of memory locations that contain an argument, associated with a context, to be passed between a pattern processing engine and said at least one associated co-processor, said controller arbitration subsystem further configured to arbitrate access to said argument signature register.

20. The function interface system as recited in claim 19 wherein said queue is a function queue subsystem configured to manage a plurality of function request queues and queue said issued function request.

21. The function interface system as recited in claim 19 further comprises an external function bus subsystem configured to process said issued function request associated with a co-processor via said external function bus.

22. The function interface system as recited in claim 21 wherein said dispatch subsystem is further configured to dispatch said issued function request to said external function bus subsystem.

23. The function interface system as recited in claim 19 wherein said at least one associated co-processor is selected from the group consisting of:
a queue engine,
an arithmetic logic unit,
a checksum engine, and
a system interface processor.

24. The function interface system as recited in claim 19 wherein said controller arbitration subsystem arbitrates access to a block buffer containing processing blocks associated with a protocol data unit (PDU).

25. The function interface system as recited in claim 24 further comprises a scheduler subsystem configured to manage a context associated with said processing blocks and schedule processing in a pattern processing engine based upon a context.

26. The function interface system as recited in claim 25 wherein said pattern processing engine comprises a first and second flow engine configured to process one of said processing blocks based upon said context.

27. The function interface system as recited in claim 26 wherein said first flow engine processes even number contexts and said second flow engine processes odd number contexts.

28. For use with a fast pattern processor having an internal function bus and an external function bus, a function interface system, comprising:
a controller arbitration subsystem configured to process an issued function request received from at least one of said internal function bus and said external function bus;
a dispatch subsystem configured to retrieve said issued function request from a queue associated with said controller arbitration subsystem and dispatch said issued function request to at least one associated co-processor via said controller arbitration subsystem; and
an external function bus subsystem configured to process said issued function request associated with a co-processor via said external function bus, said dispatch subsystem configured to dispatch said issued function request to said external function bus subsystem.

29. The function interface system as recited in claim 28 wherein said queue is a function queue subsystem configured to manage a plurality of function request queues and queue said issued function request.

30. The function interface system as recited in claim 28 further comprises an argument signature register having a plurality of memory locations that contain an argument, associated with a context, to be passed between a pattern processing engine and said at least one associated co-processor, said controller arbitration subsystem further configured to arbitrate access to said argument signature register.

31. The function interface system as recited in claim 28 wherein said at least one associated co-processor is selected from the group consisting of:
a queue engine,
an arithmetic logic unit,
a checksum engine, and
a system interface processor.

32. The function interface system as recited in claim 28 wherein said controller arbitration subsystem arbitrates access to a block buffer containing processing blocks associated with a protocol data unit (PDU).

33. The function interface system as recited in claim 32 further comprises a scheduler subsystem configured to manage a context associated with said processing blocks and schedule processing in a pattern processing engine based upon a context.

34. The function interface system as recited in claim 33 wherein said pattern processing engine comprises a first and second flow engine configured to process one of said processing blocks based upon said context.

35. The function interface system as recited in claim 34 wherein said first flow engine processes even number contexts and said second flow engine processes odd number contexts.

* * * * *